United States Patent Office 2,713,060
Patented July 12, 1955

2,713,060

DYESTUFF TREATMENT

Victor S. Salvin, Irvington, N. J., assignor to Celanese Corporation of America, New York, N. Y., a corporation of Delaware No Drawing. Application July 24, 1951,
Serial No. 238,381

11 Claims. (Cl. 260—380)

This invention relates to anthraquinone dyestuffs and relates more particularly to the production of improved anthraquinone dyestuffs capable of dyeing cellulose acetate or other organic derivative of cellulose textile materials in valuable blue shades.

An object of this invention is to provide a process for the treatment of certain anthraquinone dyestuffs already possessing a high degree of resistance to light and to acid fading whereby an increased affinity for cellulose acetate or other organic derivative of cellulose textile materials may be imparted thereto.

Other objects of this invention will appear from the following detailed description.

In U. S. Patent No. 2,480,269 there is described a process for the preparation of certain valuable anthraquinone dyestuffs by the condensation of an organic amine with a hydroxy-substituted anthraquinone containing a plurality of nitrogroups, at least one of which is in para-position to a hydroxy group. The reaction, as described therein, is carried out under relatively mild conditions so that only one of the nitro groups present reacts with and is replaced by the organic amine. The anthraquinone dyestuffs which may be obtained in accordance with the process of said patent are quite valuable since they exhibit a very unusual degree of resistance to fading when exposed to acid fumes.

I have now found that the dyeing characteristics of the dyestuffs described in said U. S. Patent No. 2,480,269 may be even further improved if the dyestuffs which are obtained by the condensation of said organic amine and hydroxy-substituted nitro-anthraquinone are subjected to a treatment with an alkaline reacting agent while in solution in an organic solvent for said dyestuffs. The organic solvent should be present with some water. While the mechanism of the treatment of said dyestuffs in solution in an organic solvent with an alkaline agent is not entirely understood, it is believed to be in the nature of a purification treatment whereby not only are certain solvent-insoluble material separated from the amine-nitro-anthraquinone condensation reaction product but, in addition, any ether groups which may be formed are split by hydrolysis. It is also believed that the alkaline treatment improves the dyeing properties of any azoxy compounds present.

As alkaline agents which may be employed in carrying out my novel dyestuff purification treatment there may be mentioned sodium carbonate and pyridine, but optimum results are obtained employing alkali metal hydroxides such as sodium hydroxide and potassium hydroxide. Most advantageously, the alkaline agent is used in sufficient amount to enable the pH to be held to a minimum of 11.0.

As solvents which may be utilized in effecting my novel process there may be mentioned dioxane, methyl alcohol, ethyl alcohol and butyl carbitol.

Preferably, in carrying out said purification process, the crude dyestuff undergoing treatment is dissolved in 8 to 15 parts by weight of the liquid solvent mixture for each part by weight of said crude dyestuff, the solvent mixture containing 5 to 10 parts by weight of water, 2 to 5 parts by weight of organic solvent and 0.5 to 1.5 parts by weight of the alkaline agent, and the resulting mixture heated under reflux for 6 to 12 hours. While still hot, the dyestuff solution is filtered and the insoluble material removed. The filtrate is then diluted with water and, upon being acidified with an acid, such as glacial acetic acid or formic acid the purified dyestuff precipitates from solution and may be separated by filtration.

As brought out in said aforementioned patent, the dyestuffs treated by my novel process may be obtained by reacting hydroxy-substituted poly-nitro-anthraquinone compounds such as, for example, 4,8-dinitro-anthrarufin, 4,8-dinitro-anthrachrysone, 4,5-dinitro-chrysazin, 1,6-dihydroxy-4,5-dinitro-anthraquinone, 1,7-dihydroxy-4,5-dinitro-anthraquinone etc., with a primary organic amine which may be an aliphatic, cycloaliphatic, heterocyclic or most advantageously a primary aromatic amine. Examples of the amines which may be employed are methylamine ethylamine propylamine butylamine, ethanolamine, butanolamine, 3-amino-4-heptanol, tris-hydroxymethylamino-methane, cyclohexylamine, benzylamine, amino-pyridine, amino-quinoline, aniline, toluidine, amino-ethyl benzene, amino-acetophenone, amino-cresol, amino-phenol, sulfanilamide, p-amino-benzamide, p-amino-benzoic acid and esters thereof, p-anisidine, p-phenetidine, 2,5-dimethoxy aniline, p-phenylene diamine and naphthylamine, meta-amino benzyl alcohol.

The primary organic amines and nitro-anthraquinone compounds are preferably reacted in such molecular ratio that the number of amino groups in the reaction mixture are in excess of the number of nitro groups on the anthraquinone compound condensed therewith. Preferably, a ratio of from 5 to 10 or even 15 mols of the primary amine are employed in the condensation reaction for each mol of the nitro-anthraquinone compound condensed therewith. The condensation reaction is preferably carried out under reflux for about 2 to 4 hours, when the reaction mixture becomes greenish-blue indicating a complete or substantially complete condensation.

The use of reaction temperatures of 100 to 130° C. with water present in the reaction medium is highly advantageous when condensing a hydroxy-substituted nitro-anthraquinone containing but one nitro group, such as 4-nitro-alizarin, 4-nitro-anthragallol or 1-hydroxy-4-nitro-anthraquinione, with a primary amine such as those indicated above. Under these conditions, side reactions such as the formation of azoxy compounds or the reduction of the nitro group to an amine group are minimized. The major product obtained is that formed by replacement of the nitro group by the primary amine, yielding a substituted-amino-hydroxy-anthraquinone.

In order further to illustrate the novel process of my invention, the following examples are given:

*Example 1*

A mixture of 20 parts by weight of 4,8-dinitro-anthrarufin, 81.5 parts by weights of aniline and 3 parts by weight of water are heated with agitation at 105 to 110° C. for four hours. The reaction mixture is cooled and poured into 160 parts by weight of ethyl alcohol. A mixture of 150 parts by weight of 32% hydrochloric acid with 150 parts by weight of water are added to the alcohol suspension and the dyestuff present precipitates in crystalline form. The dyestuff, 4-anilino-8-nitro-anthrarufin, is filtered off and washed with a solution made up of equal volumes of hydrochloric acid and water.

20 parts by weight of the dyestuff thus obtained is added to a mixture of 60.0 parts by weight of dioxane, 120 parts by weight of water, and 30 parts by weight of a 50% by weight aqueous solution of sodium hydroxide.

The dyestuff solution is refluxed for 12 hours and then filtered while still hot. 400 parts by weight of water are then added to dilute the solution and, upon addition of 26 parts by weight of glacial acetic acid the modified dyestuff is precipitated from solution. The dyestuff dyes cellulose acetate textile materials in blue shades having an acid fading resistance of 5 A. A. T. C. C. units when dyed in either pastel, light or medium shades. The modified dyestuff shows excellent pile-on characteristics and the dyed fabrics can be built up to medium-full shades. When one part by weight of dyestuff is milled with 1.8 parts by weight of lignin sulfonate and 0.6 parts by weight of tetrasodium phosphate, an excellent dyestuff disperse powder is obtained which gives a fine dispersion. The affinity of the dyestuff when dyed from a dispersion is practically equivalent to the affinity from a solvent dyebath. The resistance to acid fading is unchanged.

It is to be understood that the foregoing detailed description is given merely by way of illustration and that many variations may be made therein without departing from the spirit of my invention.

Having described my invention, what I desire to secure by Letters Patent is:

1. In a process for the production of improved anthraquinone dyestuffs wherein a hydroxy-substituted nitroanthraquinone is condensed with an organic primary amine at a temperature of 100 to 130° C. in the presence of water, the step which comprises treating the dyestuff obtained as a product of the condensation by subjecting the same to refluxing while in solution in an organic solvent containing an alkaline agent.

2. In a process for the production of improved anthraquinone dyestuffs wherein a hydroxy-substituted nitroanthraquinone is condensed with an organic primary amine at a temperature of 100 to 130° C. in the presence of water, the step which comprises treating the dyestuff obtained as a product of the condensation by subjecting the same to refluxing while in solution in an organic solvent mixture containing an alkaline agent, said solution comprising 2 to 5 parts by weight of organic solvent, 5 to 10 parts by weight of water and 0.5 to 1.5 parts by weight of said alkaline agent, for each part by weight of the dyestuff.

3. In a process for the production of improved anthraquinone dyestuffs wherein a hydroxy-substituted nitroanthraquinone is condensed with an organic primary amine at a temperature of 100 to 130° C. in the presence of water, the step which comprises treating the dyestuff obtained at a product of the condensation by subjecting the same to refluxing while in solution in dioxane containing an alkali metal hydroxide.

4. In a process for the production of improved anthraquinone dyestuffs wherein a hydroxy-substituted nitroanthraquinone is condensed with an organic primary amine at a temperature of 100 to 130° C. in the presence of water, the step which comprises treating the dyestuff obtained as a product of the condensation by subjecting the same to refluxing while in solution in 2 to 5 parts by weight of dioxane containing 5 to 10 parts by weight of water and 0.5 to 1.5 parts by weight of an alkali metal hydroxide, for each part by weight of the dyestuff.

5. In a process for the production of improved anthraquinone dyestuffs wherein a hydroxy-substituted nitroanthraquinone is condensed with an organic primary amine at a temperature of 100 to 130° C. in the presence of water, the step which comprises treating the dyestuff obtained as a product of the condensation by subjecting the same to refluxing while in solution in 2 to 5 parts by weight of dioxane containing 5 to 10 parts by weight of water and 0.5 to 1.5 parts by weight of sodium hydroxide, for each part by weight of the dyestuff.

6. In a process for the production of improved anthraquinone dyestuffs wherein a hydroxy-substituted nitroanthraquinone is condensed with an organic primary amine at a temperature of 100 to 130° C. in the presence of water, the step which comprises treating the dyestuff obtained as a product of the condensation by subjecting the same to refluxing for 6 to 12 hours while in solution in an organic solvent containing an alkaline agent, said solution comprising 2 to 5 parts by weight of organic solvent, 5 to 10 parts by weight of water and 0.5 to 1.5 parts by weight of said alkaline agent for each part by weight of the dyestuff.

7. In a process for the production of improved anthraquinone dyestuffs wherein a hydroxy-substituted nitroanthraquinone is condensed with an organic primary amine at a temperature of 100 to 130° C. in the presence of water, the step which comprises treating the dyestuff obtained as a product of the condensation by subjecting the same to refluxing for 6 to 12 hours while in solution in 2 to 5 parts by weight of dioxane containing 5 to 10 parts by weight of water and 0.5 to 1.5 parts by weight of an alkali metal hydroxide, for each part by weight of the dyestuff.

8. In a process for the production of improved anthraquinone dyestuffs wherein a hydroxy-substituted nitroanthraquinone is condensed with an organic primary amine at a temperature of 100 to 130° C. in the presence of water, the step which comprises treating the dyestuff obtained as a product of the condensation by subjecting the same to refluxing for 6 to 12 hours while in solution in 2 to 5 parts by weight of dioxane containing 5 to 10 parts by weight of water and 0.5 to 1.5 parts by weight of sodium hydroxide, for each part by weight of the dyestuff.

9. In a process for the production of improved anthraquinone dyestuffs wherein a hydroxy-substituted nitroanthraquinone is condensed with an organic primary amine at a temperature of 100 to 130° C. in the presence of water, the steps which comprise treating the dyestuff obtained as a product of the condensation by subjecting the same to refluxing for 6 to 12 hours while in solution in an organic solvent containing an alkaline agent, said solution comprising on the weight of the dyestuff of 2 to 5 parts by weight of organic solvent, 5 to 10 parts by weight of water and 0.5 to 1.5 parts by weight of said alkaline agent, filtering the solution, diluting the filtrate with water, acidifying the filtrate, precipitating the dyestuff from solution and separating the dyestuff therefrom.

10. In a process for the production of improved anthraquinone dyestuffs wherein a hydroxy-substituted nitroanthraquinone is condensed with an organic primary amine at a temperature of 100 to 130° C. in the presence of water, the steps which comprise treating the dyestuff obtained as a product of the condensation by subjecting the same to refluxing for 6 to 12 hours while in solution in 2 to 5 parts by weight of dioxane containing 5 to 10 parts by weight of water and 0.5 to 1.5 parts by weight of an alkali metal hydroxide for each part by weight of the dyestuff, filtering the solution, diluting the filtrate with water, acidifying the filtrate, precipitating the dyestuff from solution and separating the dyestuff therefrom.

11. In a process for the production of improved anthraquinone dyestuffs wherein a hydroxy-substituted nitroanthraquinone is condensed with an organic primary amine at a temperature of 100 to 130° C. in the presence of water, the steps which comprise treating the dyestuff obtained as a product of the condensation by subjecting the same to refluxing for 6 to 12 hours while in solution in 2 to 5 parts by weight of dioxane containing 5 to 10 parts by weight of water and 0.5 to 1.5 parts by weight of sodium hydroxide for each part by weight of the dyestuff, filtering the solution, diluting the filtrate with water, acidifying the filtrate, precipitating the dyestuff from solution and separating the dyestuff therefrom.

References Cited in the file of this patent
UNITED STATES PATENTS
2,480,269     Seymour et al. _____ Aug. 30, 1949